United States Patent

Nagaoka et al.

Patent Number: 4,882,396
Date of Patent: Nov. 21, 1989

[54] SILOXANE-AMIDE BLOCK COPOLYMER AND PROCESS FOR PRODUCING THE SAME

[75] Inventors: Hisayuki Nagaoka; Michio Zenbayashi, both of Gunma, Japan

[73] Assignee: Toshiba Silicone Co., Ltd., Tokyo, Japan

[21] Appl. No.: 228,642

[22] Filed: Aug. 5, 1988

[30] Foreign Application Priority Data

Aug. 7, 1987 [JP] Japan ................... 62-197505
Oct. 7, 1987 [JP] Japan ................... 62-253395

[51] Int. Cl.$^4$ ............................................ C08F 283/04
[52] U.S. Cl. ......................... 525/426; 525/430; 528/26; 528/28; 522/99
[58] Field of Search ............ 528/26, 38; 525/426, 525/430; 522/99

[56] References Cited

U.S. PATENT DOCUMENTS 4,168,360 9/1979 D'Alelio ................... 525/462
4,278,786 7/1981 Nanaumi et al. ........... 525/185

Primary Examiner—Melvyn I. Marquis
Attorney, Agent, or Firm—Sughrue, Mion, Zinn, Macpeak & Seas

[57] ABSTRACT

A siloxane-amide block copolymer having an alkenyl group or a photopolymerizable organic group at both terminals thereof which is represented by formula (I):

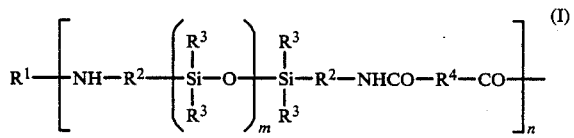

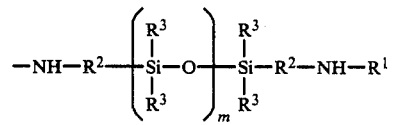

wherein $R^1$ represents a reaction residual group of an epoxy compound containing an alkenyl group or a photopolymerizable organic group and/or a substitution reaction product between said reaction residual group and an organosilyl group and the other symbols are as defined in the specification. The copolymer is produced by reacting a polycondensate of a diaminosiloxane and a dicarboxylic acid dihalide with a compound containing an alkenyl group or a photopolymerizable organic group at one terminal thereof and an epoxy group at the other terminal thereof. The siloxane-amide block copolymer exhibits excellent processability and reactive curability by application of heat, light or radiation.

9 Claims, No Drawings

SILOXANE-AMIDE BLOCK COPOLYMER AND PROCESS FOR PRODUCING THE SAME

FIELD OF THE INVENTION

This invention relates to a novel siloxane-amide block copolymer and a process for producing the same. More particularly, it relates to a siloxane-amide block copolymer containing an alkenyl group or a photopolymerizable organic group at both terminals thereof which exhibits excellent processability and excellent reactive curability attributed to the alkenyl terminal groups or excellent curability with light or radiation attributed to the photopolymerizable organic terminal groups, and to a process for producing the same.

BACKGROUND OF THE INVENTION

Polyamide is known to have excellent mechanical properties combined with satisfactory heat resistance and abrasion resistance. Taking full advantage of these performance properties, it is utilized as electrical insulating materials, various molding materials, coating materials, impregnating materials, and the like in a wide application, such as domestic and industrial equipments or devices, electronic industrial parts, automobile parts, gears, etc.

Inspite of the excellent characteristics, polyamide, particularly aromatic polyamide, has extremely poor processability. Namely, the aromatic polyamide is hardly melted; or, if melted, requires a very high temperature for melting; or organic solvents in which it is soluble are limited to a very narrow range. As a result, great difficulties arise in processing polyamide.

In order to eliminate this disadvantage, it has been proposed to polycondensate an aromatic etherdiamine and an aromatic dicarboxylic acid or a reactive derivative thereof to produce an aromatic polyetheramide polymer having excellent processability, as disclosed in U.S. Pat. No. 4,278,786.

The above-described aromatic polyetheramide polymer is characterized not only by its excellent processability but by excellent heat resistance. However, since this polymer is thermoplastic, though excellent in heat resistance, it undergoes melting and deformation at temperatures over the range of allowable high temperature use.

SUMMARY OF THE INVENTION

One object of this invention is to overcome the above-described disadvantages associated with the conventional aromatic polyetheramide polymer and to provide a siloxane-amide block copolymer excellent in processability as well as reactive curability.

Another object of this invention is to provide a process for producing the above-described siloxaneamide block copolymer.

As a result of extensive investigations, it has now been found that a siloxane-amide block copolymer having excellent processability and curability attributed to its alkenyl groups or photopolymerizable organic groups at both terminals thereof which induce cross-linking on application of heat, light or radiation, the block copolymer being represented by formula (I):

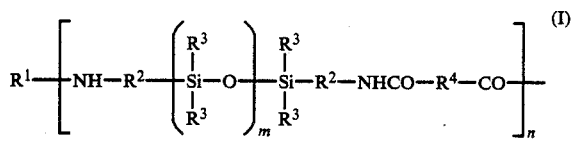

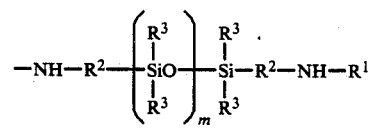

wherein $R^1$ represents a reaction residual group of an epoxy compound containing an alkenyl group or a photopolymerizable organic group and/or a substitution reaction product between the reaction residual group and an organosilyl group; $R^2$ represents a substituted or unsubstituted divalent hydrocarbon group; $R^3$ represents a substituted or unsubstituted monovalent hydrocarbon group; $R^4$ represents a substituted or unsubstituted divalent aromatic hydrocarbon group; and m and n each represents a number of 1 or more, can be obtained by polymerizing a diaminosiloxane represented by formula (II):

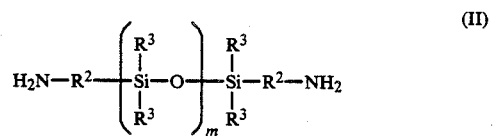

wherein $R^2$, $R^3$ and m are as defined above, and a dicarboxylic acid dihalide represented by formula (III):

wherein $R^4$ is as defined above; and Z represents a halogen atom, to obtain a polycondensate and adding an epoxy compound containing both an alkenyl group or a photopolymerizable organic group and an epoxy group in the molecule thereof to the polycondensate to thereby induce ring-opening addition reaction between the terminal amino groups of the polycondensate and the epoxy group in the epoxy compound. The present invention has been completed based on this finding.

That is, the present invention relates to a siloxane-amide block copolymer having an alkenyl group or a photopolymerizable organic group at both terminals thereof as represented by formula (I) which exhibits excellent characteristics and to a process for producing the same.

DETAILED DESCRIPTION OF THE INVENTION

The siloxane-amide block copolymer represented by formula (I) can be produced from the diaminosiloxane represented by formula (II), the dicarboxylic acid dihalide represented by formula (III), and the compound containing an alkenyl group or a photopolymerizable organic group at one terminal thereof and an epoxy group at the other terminal thereof.

In formula (II), $R^2$ represents a substituted or unsubstituted divalent hydrocarbon group and includes a trimethylene group, a tetramethylene group, a pentamethylene group, a phenylene group, a tolylene group, a dimethylphenylene group, etc. $R^3$ represents a substituted or unsubstituted monovalent hydrocarbon group and includes methyl, ethyl, propyl, butyl, pentyl, hexyl, phenyl, tolyl, xylyl, halophenyl, halotolyl, cyanoethyl, and 3,3,3-trifluoropropyl groups. m is a number of 1 or more. Specific examples of the diaminosiloxane of formula (II) are shown below.

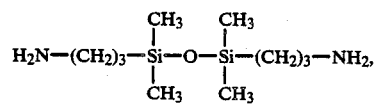

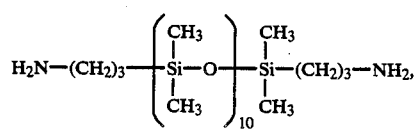

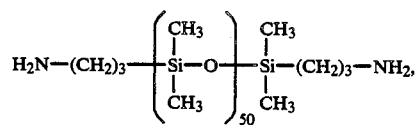

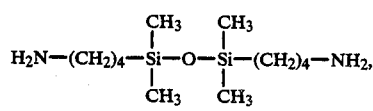

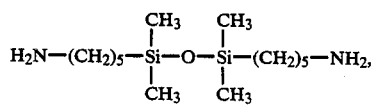

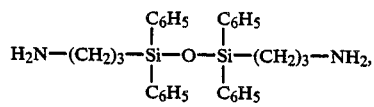

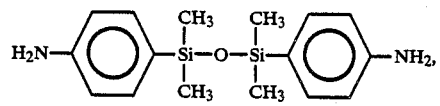

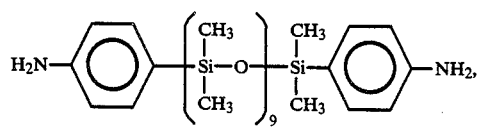

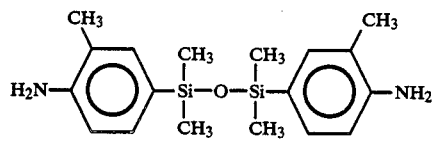

These compounds may be used either individually or in combination of two or more thereof.

In formula (III), the substituted or unsubstituted divalent aromatic hydrocarbon group as represented by $R^4$ includes phenylene, tolylene, dimethylphenylene, halogenated phenylene, naphthalene, diphenyl ether, diphenylmethane, diphenylsulfone, and diphenyl sulfide groups. The halogen atom as represented by Z includes chlorine, fluorine, and bromine atoms. Specific examples of the dicarboxylic acid dihalide of formula (III) include a dichloride, difluoride or dibromide of terephthalic acid, isophthalic acid, 1,4-naphthalenedicarboxylic acid, 1,5-naphthalenedicarboxylic acid, 2,6-naphthalenedicarboxylic acid, 4,4'-diphenylmethanedicarboxylic acid, 3,3'-diphenyletherdicarboxylic acid, 4,4'-diphenyletherdicarboxylic acid, 4,4'-diphenylmethanedicarboxylic acid, 3,3'-diphenylmethanedicarboxylic acid, 4,4'-diphenylsulfide dicarboxylic acid, 3,3'-diphenylsulfide dicarboxylic acid, and so on. These compounds may be used either individually or in combination of two or more thereof.

The compounds containing an alkenyl group at one terminal thereof and an epoxy group at the other terminal thereof are

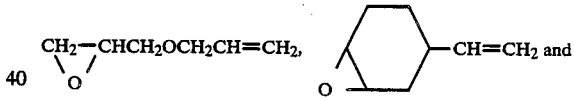

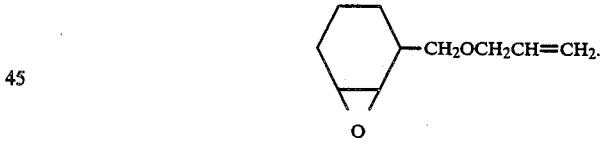

Such the compound can also include a reaction product between diglycidyl ether, etc. and allylamine, etc. Sepcific examples of such a reaction product are shown below.

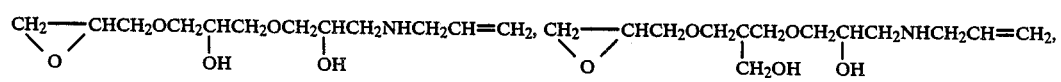

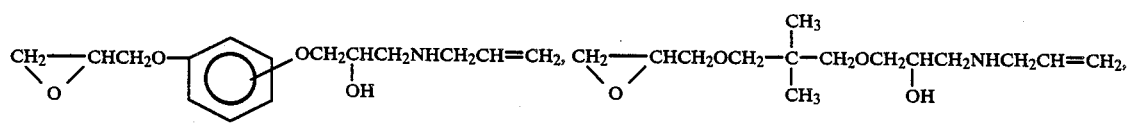

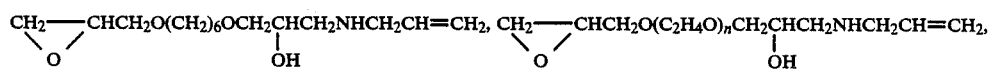
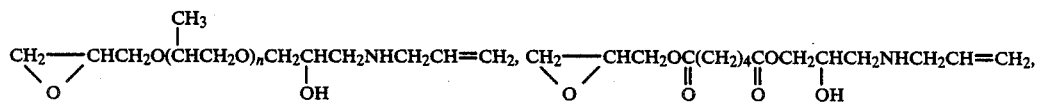
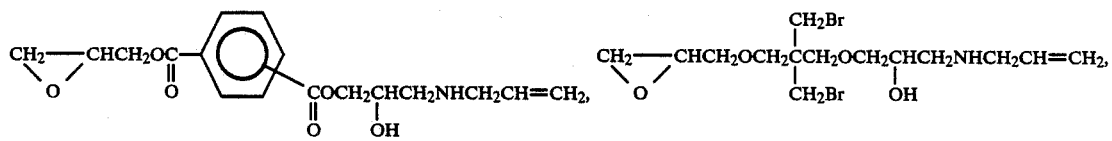
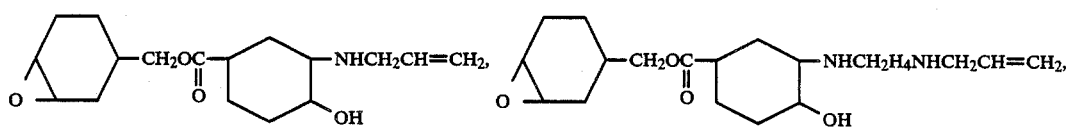
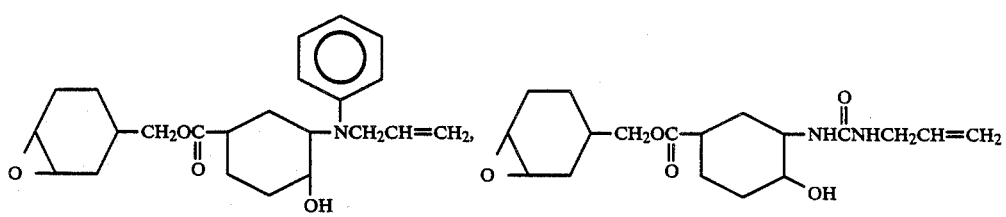
The compounds containing a photopolymerizable organic group at one terminal thereof and an epoxy group at the other terminal thereof are
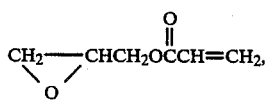
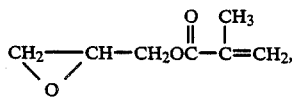
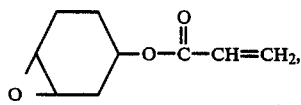
-continued
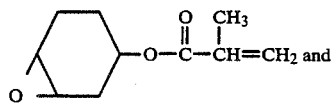
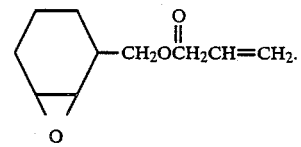
Such the compound can also include a reaction product between diglycidyl ether, etc. and acrylamide, etc. Specific examples of such a reaction product are shown below.
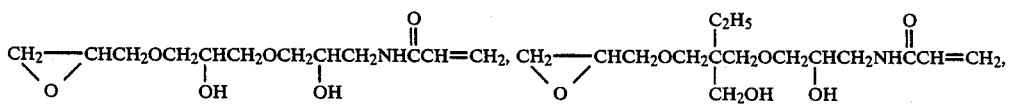
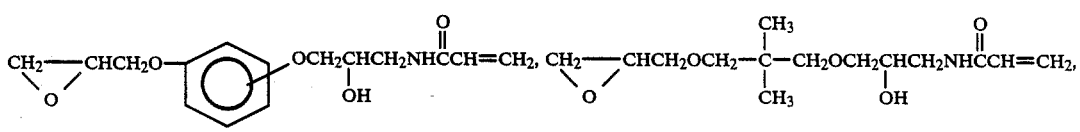
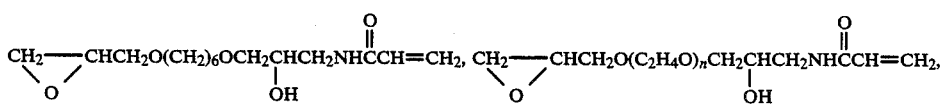

-continued

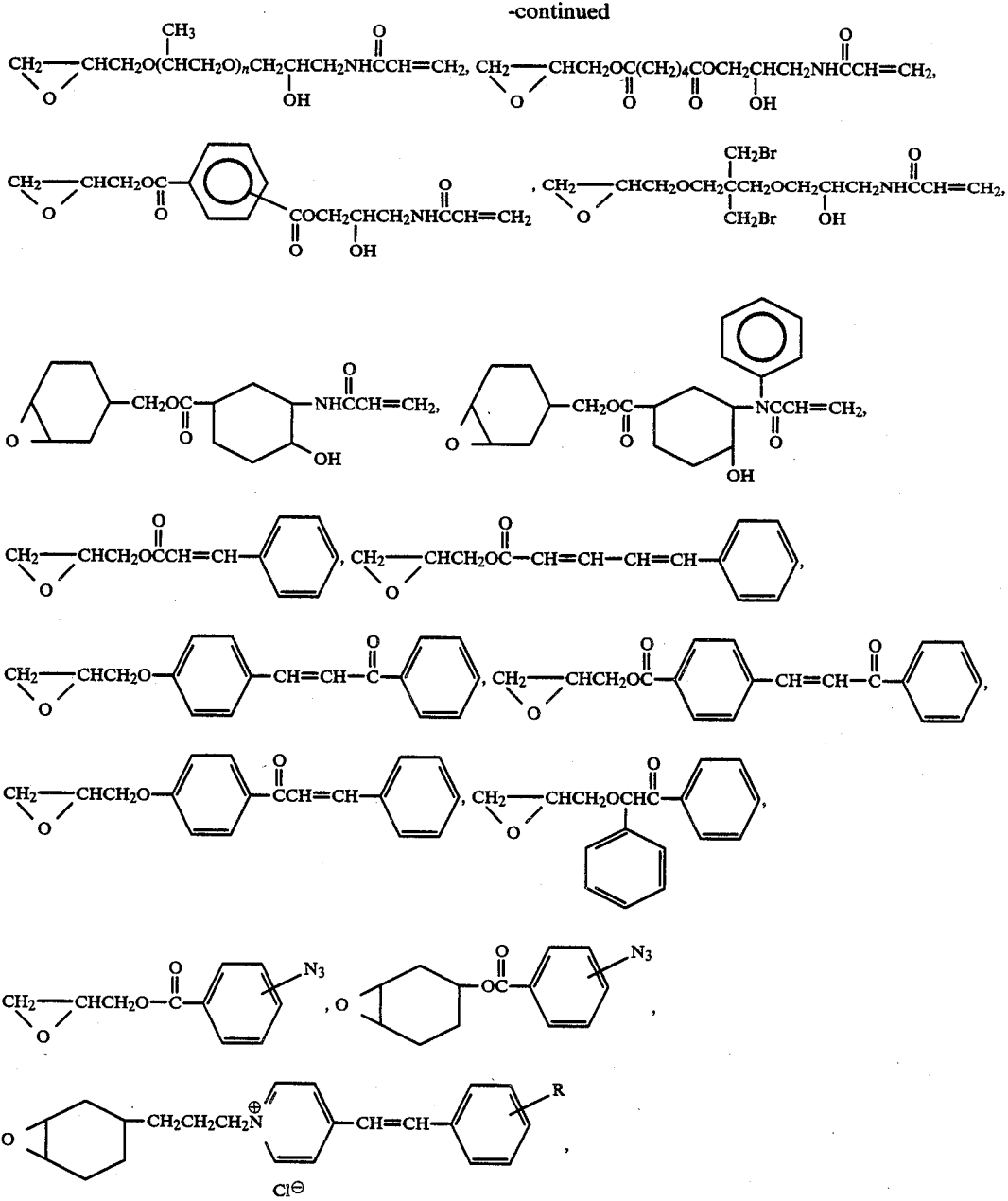

wherein R represents an alkyl or halogenated alkyl group having from 1 to 8 carbon atoms, an alkoxy group having from 1 to 8 carbon atoms, or a halogen atom.

In the production of the siloxane-amide block copolymer represented by formula (I), the diaminosiloxane of formula (II) and the dicarboxylic acid dihalide of formula (III) are subjected to polycondensation. After the reaction, the reaction mixture is washed with water and dried to obtain a polymer. To the resulting polymer is added the compound containing an alkenyl group or a photopolymerizable organic group at one terminal thereof and an epoxy group at the other terminal thereof to thereby induce ring-opening addition reaction between the amino group at both terminals of the polymer and the epoxy group in the epoxy compound.

In carrying out the polycondensation, it is required, taking the subsequent reaction with the epoxy compound into consideration, that the diaminosiloxane be charged in a slight excess over the dicarboxylic acid dihalide. Specifically, the amount of the diaminosiloxane to be charged ranges from 1.005 to 2.0 moles, preferably from 1.01 to 1.5 moles, per mole of the dicarboxylic acid dihalide. If it is less than 1.005 mole, the resulting copolymer does not always contain an amino group at both terminals thereof. If it exceeds 2.0 moles, the copolymer finds difficulty in growing to have a molecular weight enough to exhibit satisfactory physical properties.

Upon ring-opening addition reaction by the epoxy group of the epoxy compound, a hydroxyl group is formed in the vicinity of the both terminals of the copolymer as a side chain. If necessary, the hydroxyl groups thus formed may be modified (i.e., substituted) with, for example, a silylating agent (e.g.,

[(CH$_3$)$_3$Si]$_2$NH, (CH$_3$)$_3$SiN(C$_2$H$_5$)$_2$, (CH$_3$)$_3$SiCl,

, CH$_3$CNHSi(CH$_3$)$_3$, [(CH$_3$)$_3$SiNH]$_2$C=O, and

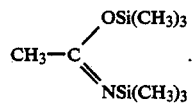

Characteristic properties of the siloxane-amide block copolymer produced by the process of this invention are subject to wide variations depending on the kind of the diaminosiloxane, the length of the siloxane unit, the kinds and amounts of the dicarboxylic acid dihalide and epoxy compound, and the like. It should be understood, however, that the resulting siloxane-amide block copolymer sufficiently possesses desirable characteristics, such as excellent processability as well as excellent mechanical properties and heat resistance inherent to polyamide resins.

The polycondensation between the diaminosiloxane and the dicarboxylic acid dihalide is carried out at a temperature ranging from 10° C. to 100° C. The use of an organic or inorganic solvent and a base as a catalyst is preferable to facilitate the reaction. The organic solvent includes toluene, xylene, chlorobenzene, dichlorobenzene, hexane, octane, diethyl ketone, dibutyl ketone, cyclohexanone, chloroform, 1,2-dichloroethane, 1,1,2,2-tetrachloroethane, N,N-dimethylformamide, N,N-dimethylacetamide, N-methyl-2-pyrrolidone, and mixtures thereof. The inorganic solvent includes an aqueous solution of sodium hydroxide or sodium carbonate. The base catalyst includes triethylamine, diisopropylmethylamine.

The reaction temperature for the ring-opening addition of the epoxy compound to the amino terminals preferably ranges from 50° C. to 120° C.

The thus produced siloxane-amide block copolymer is excellent in processability and can be cured rapidly on heat application in the presence of a crosslinking agent and a curing catalyst or on irradiation of radiation, such as ultraviolet rays or electron beams, in the presence of a photosensitizer or a photopolymerization initiator to thereby provide a cured product having excellent characteristics.

The conventional polyamide resins, though excellent in mechanical and chemical properties, show insufficient processability. To the contrary, the siloxane-amide block copolymer containing an alkenyl group or a photopolymerizable organic group at both terminals thereof according to the present invention exhibits markedly improved processability. In additional it is a liquid or resinous engineering plastic exhibiting curability due to its terminal alkenyl groups or photopolymerizable polymerizable organic groups on application of heat, light or radiation. Hence, the present invention is of high industrial value because it achieves broadening of application of polyamide resins, raising the limitation due to poor processability of the conventional polyamide resins. The siloxane-amide block copolymer of the present invention can be utilized with particular advantage as highly reliable materials in the field of electric and electronic industry, such as a moistureproof or protective coating material of semi-conductor devices or a wire coating material.

The present invention is now illustrated in greater detail with reference to Examples but it should be understood that the present invention is not deemed to be limited thereto.

EXAMPLE 1

To 49.0 parts of dehydrated xylene were added 73.3 parts (0.049 mol.) of diaminophenylsiloxane having formula:

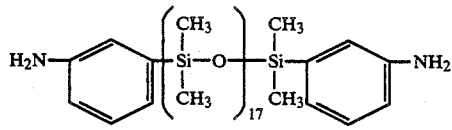

and 15.6 parts of triethylamine, and the mixture was stirred in a nitrogen atmosphere. Then, 9.0 parts (0.044 mol.) of isophthalic dichloride was dissolved in 49.0 parts of dehydrated xylene containing 3.6 parts of N-methyl-2-pyrrolidone, and the solution was added dropwise to the above-prepared mixture under stirring at room temperature. After the dropwise addition, the mixture was further stirred at room temperature for 1 hour and then at 80° C. for 8 hours to effect polymerization. The reaction product was washed with water several times and dried under reduced pressure.

As a result of gas-permeation chromatography (GPC), $^1$H-NMR spectrum, and infrared absorption spectrum, the polymer obtained was identified to be a siloxane-amide block copolymer represented by formula:

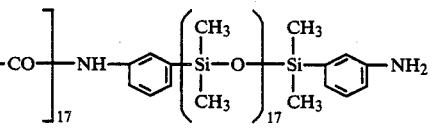

To 78.0 parts of the resulting polymer was added dropwise 0.73 parts (6.4×10$^{-3}$ mol.) of allyl glycidyl ether in a nitrogen atmosphere while stirring. After the dropwise addition, the stirring was continued for additional 2 hours under the same condition to complete the reaction. After completion of the reaction, the excess allyl glycidyl ether was removed at 100° C. under reduced pressure to obtain a reddish orange transparent product. This product was identified as the expected siloxane-amide block copolymer having formula shown below by infrared absorption spectrum:

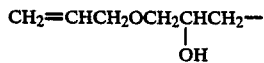

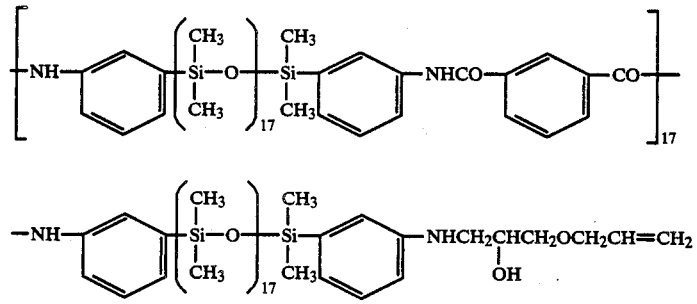

Various properties of the resulting copolymer are shown in Table 1 below.

EXAMPLE 2

To 69.7 parts of dehydrated toluene were added 73.4 parts (0.135 mol.) of diaminopropylsiloxane having formula:

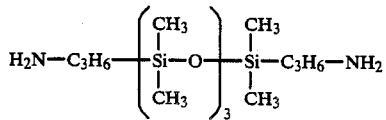

41.0 parts of diisopropylmethylamine, and 5.0 parts of 1,2-dichloroethane, and the mixture was stirred in a nitrogen atmosphere. Then, 24.9 parts (0.123 mol.) of terephthalic dichloride was dissolved in 69.7 parts of dehydrated toluene containing 5.0 parts of 1,2-dichloroethane, and the solution was added dropwise to the above prepared mixture under stirring at room temperature. After the dropwise addition, the stirring was further continued at room temperature for additional 1 hour and then at 80° C. for 8 hours to effect polymerization. The resulting product was washed with water several times and dried under reduced pressure.

As a result of GPC, ¹H-NMR spectrum, and infrared absorption spectrum, the product was identified to be a siloxane-amide block copolymer of formula:

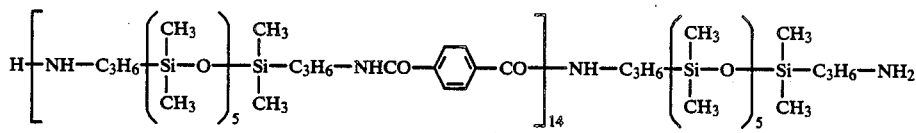

To 94.0 parts of the polymer was added dropwise 2.85 parts (0.023 mol.) of 3,4-epoxyvinylcyclohexane in a nitrogen atmosphere at 100° C. while stirring, and 1.77 parts (0.011 mol.) of hexamethyldisilazane was further added thereto dropwise. After the addition, the mixture was stirred under the same condition for 2 hours to effect reaction. After completion of the reaction, the excess epoxyvinylcyclohexane and silazane, etc. were removed at 100° C. under reduced pressure to obtain a pale orange transparent product. This product was identified as the expected siloxane-amido block copolymer of formula shown below by infrared absorption spectrum:

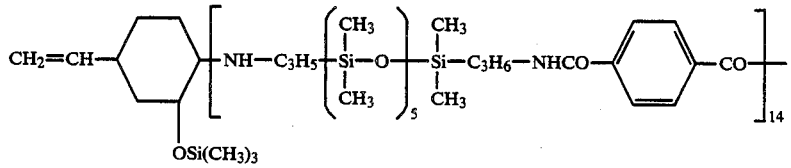

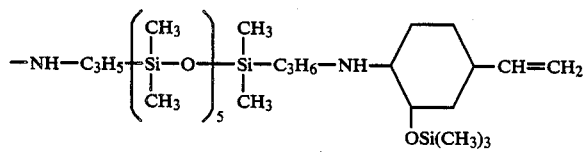

The resulting copolymer has a thermal decomposition temperature of 360° C., proving highly heat resistant. Other properties of the copolymer are shown in Table 1 below.

EXAMPLE 3

To 278 parts of ion-exchanged water were added 100 parts (0.067 mol.) of diaminophenylsiloxane of formula:

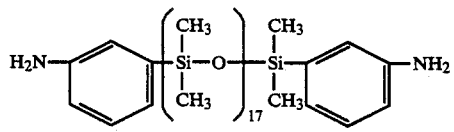

and 11.8 parts of anhydrous sodium carbonate, and the mixture was stirred to mix. Then, 11.3 parts (0.056 mol.) of isophthalic dichloride was dissolved in 89.0 parts of 1.2-dichloroethane, and the resulting solution was added dropwise to the above prepared mixture under stirring at room temperature. After the dropwise addition, the stirring was further continued for additional 8 hours at room temperature to effect polymerization. The resulting polymer was washed with water several times and dried under reduced pressure.

As a result of GPC, $^1$H-NMR spectrum, and infrared absorption spectrum, the polymer was identified to be a siloxane-amide block copolymer of formula:

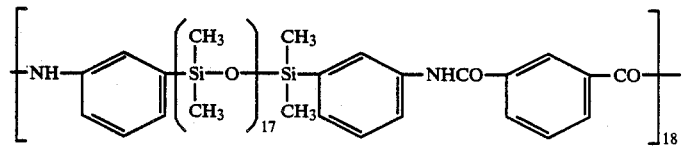

To 93.0 parts of the polymer was added dropwise 0.83 parts (0.0072 mol.) of allyl glycidyl ether at 100° C. in a nitrogen atmosphere, followed by stirring. After the addition, the stirring was further continued under the same condition for additional 2 hours to effect reaction. After completion of the reaction, the excess allyl glycidyl ether was removed at 100° C. under reduced pressure to obtain a pale yellow transparent product. This product was identified as the expected siloxane-amide block copolymer of formula shown below by infrared absorption spectrum:

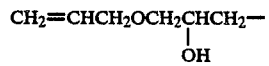

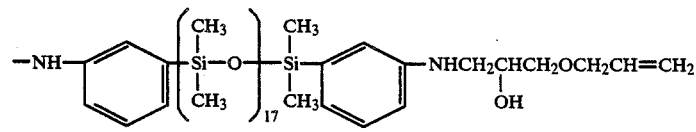

Various properties of the reuslting copolymer are shown in Table 1.

EXAMPLE 4

To 58.0 parts of dehydrated xylene were added 79.8 parts (0.093 mol.) of diaminopropylsiloxane of formula:

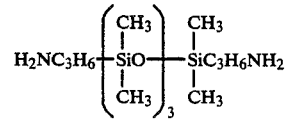

and 26.5 parts of triethylamine, followed by stirring in a nitrogen atmosphere. Then, 16.0 parts (0.079 mol.) of isophthalic dichloride was dissolved in 58.0 parts of dehydrated xylene containing 1.6 parts of N-methyl2-pyrrolidone, and the resulting solution was added dropwise to the above prepared mixture under stirring at room temperature. After the dropwise addition, the stirring was continued at room temperature for 1 hour and then at 80° C. for 1 hour to effect polymerization. The resulting polymer was washed with water several times and dried under reduced pressure. As a result of GPC, $^1$H-NMR spectrum, and infrared absorption spectrum, the product was identified to be a siloxaneamide block copolymer of formula:

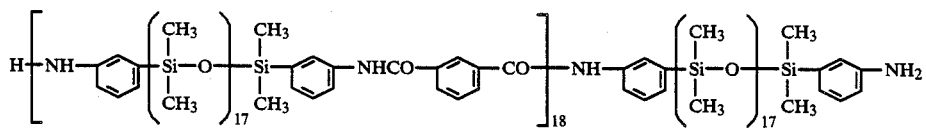

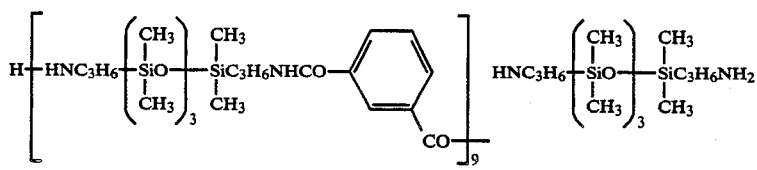

To 88.0 parts of the polymer was added 0.01 part of hydroquinone, and subsequently 3.12 parts (0.022 mol.) of glycidyl methacrylate was added dropwise thereto at 80° C. in a nitrogen atmosphere while stirring. Then, 1.77 parts (0.011 mol.) of hexamethyldisilazane was added dropwise to the mixture. After the addition, the mixture was further stirred under the same condition for 2 hours to effect reaction. After completion of the reaction, the excess methacrylate and silazane, etc. were removed at 80° C. under reduced pressure to obtain a pale yellow transparent product. As a result of GPC, $^1$H-NMR spectrum, and infrared absorption spectrum, the product was identified as the expected siloxane-amide block copolymer of formula:

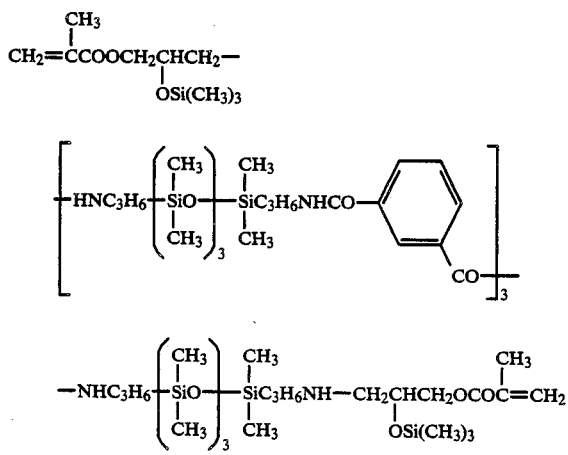

Various properties of the resulting copolymer are shown in Table 1.

EXAMPLE 5

To 69.7 parts of dehydrated toluene were added 73.4 parts (0.131 mol.) of diaminopropylsiloxane of formula:

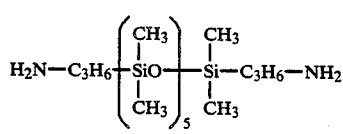

41.0 parts of diisopropylmethylamine, and 5.0 parts of 1,2-dichloroethane, and the mixture was stirred in a nitrogen atmosphere. Then, 24.9 parts (0.123 mol.) of terephthalic dichloride was dissolved in 69.7 parts of dehydrated toluene containing 5.0 parts of 1,2-dichloroethane, and the resulting solution was added dropwise to the above prepared mixture under stirring at room temperature. After the dropwise addition, the stirring was continued at room temperature for 1 hour and then at 80° C. for 8 hours to effect polymerization. The resulting polymer was washed with water several times and dried under reduced pressure. As a result of GPC, $^1$H-NMR spectrum, and infrared absorption spectrum, the product was identified to be a siloxaneamide block copolymer of formula:

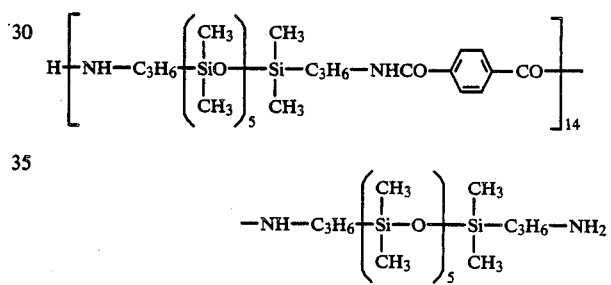

To 94.0 parts of the polymer was added 0.01 part of hydroquinone, and subsequently 4.69 parts (0.023 mol.) of glycidyl cinnamate was added dropwise thereto at 100° C. in a nitrogen atmosphere while stirring. Then, 1.77 parts (0.011 mol.) of hexamethyldisilazane was added dropwise to the mixture. After the addition, the mixture was further stirred under the same condition for 2 hours to effect reaction. After completion of the reaction, the excess cinnamate and silazane, etc. were removed at 100° C. under reduced pressure to obtain a pale orange transparent product. As a result of GPC, $^1$H-NMR spectrum, and infrared absorption spectrum, the product was identified as the expected siloxane-amide block copolymer of formula:

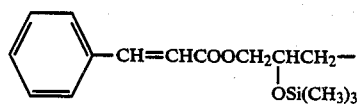

-continued

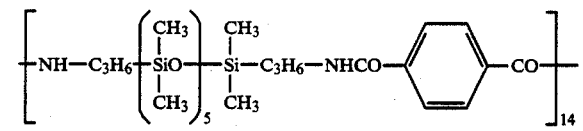

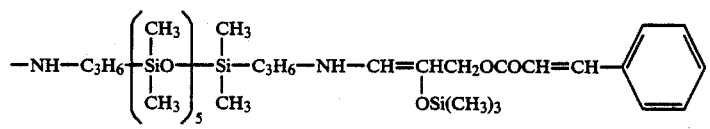

Various properties of the resulting copolymer are shown in Table 1.

TABLE 1

| Example No. | Yield (%) | Property | Processability | Reactive Curability |
|---|---|---|---|---|
| 1 | 92 | liquid with vanishingly small fluidity | excellent (liquid) | (1) cured by heating at 100° C. for 1 hour.* (2) cured by press vulcanization at 170° C. for 10 mins.** |
| 2 | 94 | soft resinous | good (m.p. = 100° C.) | (1) cured by heating at 100° C. for 1 hour.* (2) cured by press vulcanization at 170° C. for 10 mins.** |
| 3 | 94 | liquid with vanishingly small fluidity | excellent (liquid) | (1) cured by heating at 100° C. for 1 hour.* (2) cured by press vulcanization at 170° C. for 10 mins.** |
| 4 | 91 | liquid with vanishingly small fluidity | excellent (liquid) | cured by ultraviolet irradiation.*** |
| 5 | 94 | soft resinous | good (m.p. = 100° C.) | cured by ultraviolet irradiation.**** |

Note:
*Pentamethylcyclotetrasiloxane of formula:

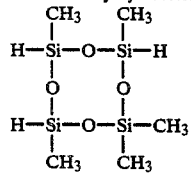

(0.75, 2.1, or 0.71 part/100 parts of the copolymer in Example 1, 2, or 3, respectively)
and $H_2PtCl_6 \cdot 6H_2O$ (0.013, 0.013, or 0.012 part/100 parts of the copolymer in
Example 1, 2, or 3, respectively) were used in combination.
**A compound of formula:

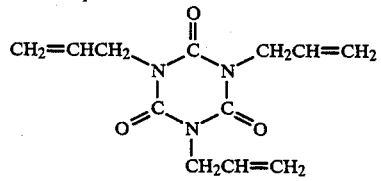

(0.56, 1.60, or 0.53 part/100 parts of the copolymer in Example 1, 2, or 3, rescpectively) and benzoyl peroxide (1.8, 5.0, or 1.7 parts/100 parts of the copolymer in Example 1, 2, or 3, respectively) were used in combination.

TABLE 1-continued

| Example No. | Yield (%) | Property | Processability | Reactive Curability |
|---|---|---|---|---|

***Micher's ketone (5.0 parts/100 parts of the copolymer) was used in combination. The irradiation was effected by using a high-pressure mercury lamp (160 W/cm) at a distance of 10 cm for 30 seconds.

****t-Butyl peroxybenzoate (3.0 parts/100 parts of the copolymer) was used in combination. The irradiation was effected by using a high-pressure mercury lamp (160 W/cm) at a distance of 10 cm for 60 seconds.

While the invention has been described in detail and wtih reference to specific embodiments thereof, it will be apparent to one skilled in the art that various changes and modifications can be made therein without departing from the spirit and scope thereof.

What is claimed is:

1. A siloxane-amide block copolymer having an alkenyl group or a photopolymerizable organic group at both terminals thereof which is represented by formula (I):

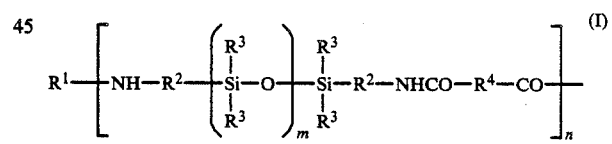

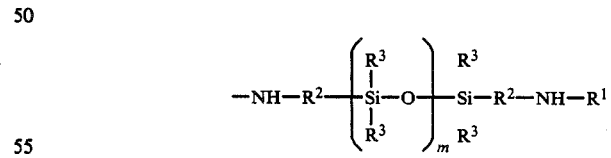

wherein $R^1$ represents a reaction residual group of an epoxy compound containing a photopolymerizable organic group formed by a ring-opening addition reaction between the amino group at both terminals of the block copolymer and the epoxy group of the epoxy compound and/or a substitution reaction product between said reaction residual group of the block copolymer and a silylating agent; $R^2$ represents a substituted or unsubstituted divalent hydrocarbon group; $R^3$ represents a substituted or unsubstituted monovalent hydrocarbon group; $R^4$ represents a substituted or unsubstituted divalent aromatic hydrocarbon group; and m and n each represents a number of 1 or more.

2. A siloxane-amide block copolymer having an alkenyl group at both terminals thereof as claimed in claim 1, wherein $R^1$ is

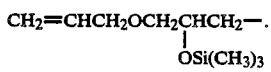

3. A siloxane-amide block copolymer having an alkenyl group at both terminals thereof as claimed in claim 1, wherein $R^1$ is

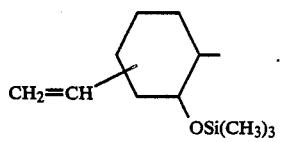

4. A siloxane-amide block copolymer having a photopolymerizable organic group at both terminals thereof as claimed in claim 1, wherein $R^1$ is

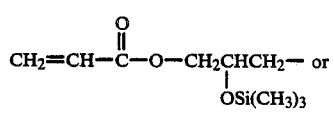

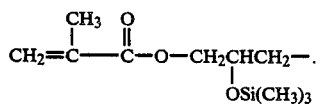

5. A siloxane-amide block copolymer having a photopolymerizable organic group at both terminals thereof as claimed in claim 1, wherein $R^1$ is

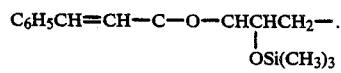

6. A process for producing a siloxane-amide block copolymer represented by formula (I):

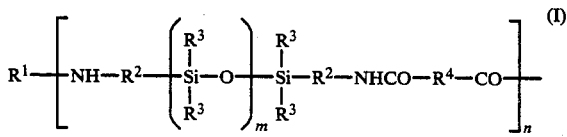

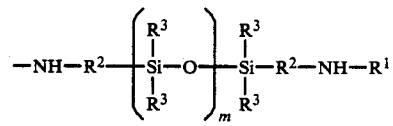

wherein
$R^1$ represents a reaction residual group of an epoxy compound containing a photopolymerizable organic group formed by a ring-opening addition reaction between the amino group at both terminals of the block copolymer and the epoxy group of the epoxy compound and/or a substitution reaction product between said reaction residual group of the block copolymer and a silylating agent;
$R^2$ represents a substituted or unsubstituted divalent hydrocarbon group;
$R^3$ represents a substituted or unsubstituted divalent aromatic hydrocarbon group,
$R^4$ represents a sunstituted or unsubstituted divalent aromatic hydrocarbon group; and m and n each represents a number of 1 or more, which comprises mixing a diaminosiloxane represented by formula (II):

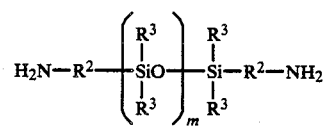

wherein $R^2$, $R^3$ and m are as defined above, and a dicarboxylic acid dihalide represented by formula (III) in an amount of from 1.005 to 2.0 mols of the diaminosiloxane per mol of the dicarboxylic acid dihalide:

 (III)

wherein $R^4$ is as defined above; and Z represents a halogen atom, to form a polycordensate; and adding a compound containing a photopolymerizable organic group at one terminal thereof and an epoxy group at the other terminal thereof.

7. A process as claimed in claim 6, wherein said dicarboxylic acid dihalide is phthalic dichloride.

8. A process as claimed in claim 6, wherein said dicarboxylic acid dihalide is isophthalic dichloride.

9. A siloxane-amide block copolymer as claimed in claim 1, wherein said photopolymerizable group is a terminal alkenyl group.

* * * * *